United States Patent [19]

Schmid

[11] Patent Number: 5,035,843

[45] Date of Patent: Jul. 30, 1991

[54] METHOD FOR PRODUCING EXPLOSIVE SUBSTANCES

[75] Inventor: Herman Schmid, Karlskoga, Sweden

[73] Assignee: Nobel Kemi AB, Sweden

[21] Appl. No.: 540,709

[22] Filed: Jun. 20, 1990

[30] Foreign Application Priority Data

Jun. 21, 1989 [SE] Sweden ................ 8902246

[51] Int. Cl.$^5$ ................................ C06C 21/00
[52] U.S. Cl. ................................ 264/3.2; 149/46;
 149/60; 149/76; 149/92; 149/93; 149/19.9;
 149/105; 149/109.6; 264/3.1; 264/3.4
[58] Field of Search .............. 149/109.6, 105, 93,
 149/92, 46, 60, 76, 19.9; 264/3.1, 3.2, 3.4

[56] References Cited

U.S. PATENT DOCUMENTS

| | | | |
|---|---|---|---|
| 4,101,358 | 7/1978 | Kim et al. ................ | 264/147 |
| 4,368,017 | 1/1983 | Rasmussen ................ | 264/173 |
| 4,420,451 | 12/1983 | Rasmussen ................ | 264/173 |
| 4,793,885 | 12/1988 | Rasmussen ................ | 264/173 |

FOREIGN PATENT DOCUMENTS

| | | |
|---|---|---|
| 501561 | 7/1930 | Fed. Rep. of Germany . |
| 501562 | 7/1930 | Fed. Rep. of Germany . |
| 2246588 | 3/1974 | Fed. Rep. of Germany . |
| 3635296 | 10/1986 | Fed. Rep. of Germany . |

Primary Examiner—Stephen J. Lechert, Jr.
Attorney, Agent, or Firm—Pollock, Vande Sande & Priddy

[57] ABSTRACT

The present invention relates to a method for producing, by means of working, mixing and homogenizing, castable explosive substances of high viscosity containing crystalline and/or particulate explosives and, if appropriate, other action-enhancing additives and such small quantities of binder and other viscosity-reducing agents that the mixture in the unworked state virtually feels like and behaves like a dry powder. In order to achieve the desired working, mixing and homogenizing, use is made of an arrangement which is known per se.

19 Claims, 3 Drawing Sheets

METHOD FOR PRODUCING EXPLOSIVE SUBSTANCES

DESCRIPTION

1. Technical Field

The present invention relates to a new method for producing castable or alternatively compressible explosive substances of high viscosity by mixing, working and homogenizing binder-containing explosive mixtures which contain crystalline and/or particulate explosives and so little binder and other viscosity-reducing agents that in the unworked state they essentially feel and behave like a dry, free-running powder. Since the explosive substances obtained in accordance with the invention have a high viscosity, the casting of these must in most cases be carried out by means of vibration feeding or at a certain pressure, but they are nevertheless castable. In order to carry out the method according to the invention, use is made of an arrangement, in the form of a so-called mixing, shearing and rolling mill, which is previously known per se and used for another purpose.

2. Background of Invention

The mixing, working and homogenizing of plastic explosive substances such as single-base and double-base propellant and certain types of explosives have hitherto been carried out, on the one hand, batchwise in mixing vessels provided with stirrers, heavy-duty mixers and rolling mills and, on the other hand, more continuously, chiefly in various types of screw presses and extruders. In the batchwise methods, the production is clearly limited by the amount of explosive substance which it is permissible to work at the same time, while the previously known continuous methods for production of the same products do not always afford the desired product quality since the degree of working is in this respect usually fixed once and for all by the size and rotational speed of the screw press or extruder, and the necessary degree of working for the explosive substance can vary quite considerably, even in the case of small variations in the starting components. It would therefore be desirable for the degree of working to be variable during one and the same run, but this is generally not the case in today's screw presses and extruders. Moreover, screw presses and extruders operate with enclosed volumes of the explosive substance, and for this reason an ignition of the substance in question during the working stage itself, for example on account of local overheating, for example as a result of compression of enclosed air (something which can easily occur), inevitably leads to an explosion, with total damage as the consequence.

SUMMARY OF INVENTION

In accordance with the present invention, use is now made instead of a so-called mixing, shearing and rolling mill which is known per se but is intended for other purposes, and which is of a special design for mixing, working and homogenizing binder-containing explosive substances of high viscosity such as solid or semi-solid explosives with additions thereto in the form of the binder in question and action-enhancing and/or phlegmatizing or other additives such as, for example, metal powder and/or wax or plastic. This special processing arrangement, which was therefore originally intended for completely different purposes, has inter alia the advantages of affording a continuous production process in which the degree of working can be altered during the course of the process and, in addition, the working takes place in a completely open manner, for which reason an ignition of the treatment material results only in the latter burning, without any associated risk of explosion.

To sum up, the present invention may thus be regarded as involving the use of an arrangement, designed for mixing and working highly viscous material such as rubber and various types of plastics, for producing binder-containing explosives comprising solid and/or semi-solid explosive substances plus additives of basic types known per se. The arrangement used in the method according to the invention, the so-called mixing, shearing and rolling mill (Misch- und Scherwalzwerk), is described in European Patent 0,148,966.

This patent thus describes how the mixing, shearing and rolling mill consists of two grooved rolls arranged parallel to each other and at an adjustable distance from each other, and rotating counter to each other at different speeds, this grooving consisting of helically cut sharp-edged channels in the roll surface, which channels form an angle of 5° to 45° to the respective roll axis. The groove channels on the different rolls are moreover angled with respect to each other, which means that, when the rolls rotate, the groove channels appear to move towards one end of the roll system. In contrast to a normal rolling mill, it is now the V-shaped roll nip which is formed between the counter-rotating surfaces of the rolls, and not the minimum roll gap between these two rolls, which is primarily used for working the mixture in question. If a highly viscous substance is conveyed to the said roll nip at the end towards which the groove channels appear to move, then the substance is successively displaced in the opposite direction to the apparent direction of movement of the groove channels. In order to function in the manner indicated above, it is necessary for the rolls to be arranged at a distance from each other adapted in relation to the viscosity of the substance. If such is the case, a film of the substance in question is formed on the one hand on the outer periphery of the fastest rotating roll, and at the same time the substance is therefore successively displaced in the direction defined above.

The transport along the roll nip and the distribution over the fastest rotating roll together with the passage through the rolling mill gap thus give the material the desired working. The slowest rotating roll at all times remains free of covering.

The degree of working can be altered by altering the distance between the rolls. Any additions can also be made anywhere along the entire length of the roll system from its input end, towards which the groove channels appear to move, to its opposite output end. An additive material which requires a great deal of working can therefore be added close to the input end, whereas a material which should not be worked too much is added close to the output end of the roll system.

The patent specification under consideration also describes a number of different methods for handling the worked material and for removing it from the rolling mill. The material can be utilized, for example, in the form of strips or bands or in the form of short rods or a granulate. The latter is obtained by allowing a drum perforated along its periphery with a large number of holes to rotate, at the output end of the rolling mill, against the faster roll, and by arranging a fixed knife inside the drum, which knife, upon each rotation, cuts off that material which has been pressed out through the perforations in the drum during the rotation.

In the EPO patent discussed above, and also in a supplement to this bearing application no. 85 116 647.0, it is stated, as has already been mentioned, that the mixing, shearing and rolling mill is particularly suitable for the transporting, mixing, homogenizing and plasticizing of rubber and various plastic materials.

BEST AND VARIOUS MODES FOR CARRYING OUT INVENTION

Figure 1:
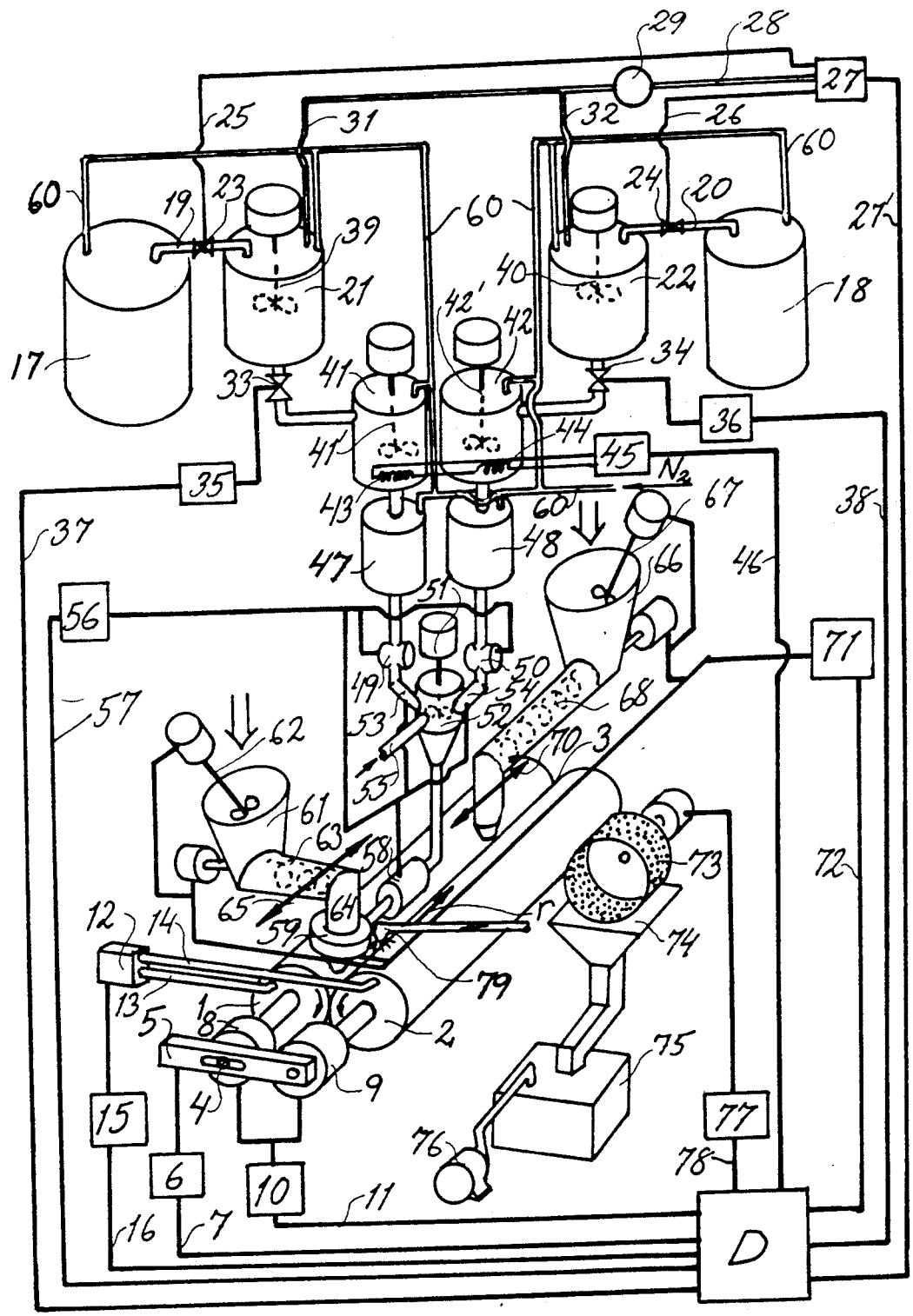
FIG. 1 shows diagrammatically a complete arrangement for carrying out a variant of the method of the present invention.

The present invention now relates to a less common application of the mixing, shearing and rolling mill according to the said patent specification. In the method according to the invention, use is made of certain properties of the arrangement in question which in other contexts are of less interest.

Thus, according to the invention, the mixing, shearing and rolling mill is used for continuous production by mixing, working and homogenizing of binder-containing or plastic-bonded explosive substances, chiefly explosives of the PBX type, and all types of workable plastic explosives of high viscosity.

It is true that the arrangement under consideration here has previously been proposed for the production of solvent-free double-base propellant, so-called POL, in which respect the arrangement was used primarily for gelatinizing the propellant and drawing off the water which was included in the water-moistened raw powder mass which was the starting material for the propellant in question. For carrying out this process, it was necessary to have heated rolls and for the rolling mill to be combined with a screw press or extruder. This process is described in German Offenlegungsschrift 3,635,296. It is also conceivable that the mixing, shearing and rolling mill could be used for the production of triple-base propellant, for example of the perchlorate propellant type for so-called base bleed units.

Among those properties which make the mixing, shearing and rolling mills so extraordinarily well suited for the working of explosives and which have not previously been completely and fully taken into consideration, there may be mentioned the fact that, firstly, these mills operate continuously and therefore do not result in large accumulations of processed explosive material and, secondly, they operate in a completely open fashion, for which reason, as has already been mentioned, a possible ignition during the working can scarcely give rise to anything other than a flame which it is easy to safeguard against and which gives rise to little or no damage at all to the apparatus.

According to a further development of the invention, several mixing, shearing and rolling mills of the type in question can also be connected in series for working those explosive substances which require intensive mechanical working. The explosive substance which is to be worked is in this case preferably transferred directly from the output end of one rolling mill to the input end of the next mill. Just as in the case of conventional rolling mills, here too the rolls cannot be made too long, even though we known that rolling mills of the type in question with rolls 2 metres long function completely satisfactorily.

One of the really significant advantages of the invention is that it is thereby possible to handle the particulate explosive and binder and also the latter's possible components individually right up to a point immediately before the working begins between the rolls of the shearing and rolling mill.

A particular problem with the type of mixture under consideration in this context is that the mixture contains so little binder and other viscosity-reducing and/or liquid or semi-liquid matter that in the unworked state it essentially feels like and behaves like a dry powder and therefore completely lacks inherent viscosity. It is only when essentially all the air has been pressed out of the mixture that the latter acquires its final castable consistency, although with a high viscosity. The alternative of pressing out the air in a closed arrangement, for example a screw press, would constitute a clear safety risk since a powerful compression of enclosed air is a common cause of accidental ignition of explosives.

The method according to the invention is intended to be used for the production of explosive substances in which there are incorporated crystalline and/or particulate explosives such as trinitrotoluene, pentaerythritol tetranitrate, HMX, RDX, HNS, ammonium nitrate and ammonium perchlorate. Other crystalline or particulate explosives not listed here may also be considered. The abbreviations HMX for cyclotetramethylene tetranitramine or octogen and RDX for cyclotrimethylene trinitramine or hexogen and HNS for hexanitrostilbene are so common that they do not need any explanation. According to the invention, other particulate components can also be included, for example in the form of action-enhancing metal powder additives, for example in the form of aluminium powder. Moreover, it is possible to add phlegmatizing and, if appropriate, viscosity-reducing agents such as waxes, but also liquid components with action-enhancing effects, for example in the form of liquid explosives such as tri oil and the extremely energized additives, more recently established in the USA, with the designations BDNPA (bis(2,2-dinitropropyl)acetal) and BDNPF (bis(2,2-dinitropropyl)formal). There is finally included, depending on the working in question, a liquid or semi-liquid binder which can consist of a thermosetting plastic, a thermoplastic or a thermoelastic. Examples of types of binders which might therefore be conceivable are two- or three-component polyurethanes, two-component silicones, two-component epoxy resin and two-component polyesters and, in addition, single-component thermoplastics and thermoelastics, such as thermoplastic rubber. Since the binder itself is a solid component, it may be necessary to dissolve it in a removable solvent which is added to the other components during the mixing operation.

A binder which is extremely suitable in this context and which happens to be a two-component polyurethane is described in Swedish Patent 85 03079-9 (449 527) (=U.S. Pat. No. 4,718,346). For certain special applications it is also possible to use extremely energized additives with a certain binder capacity, such as the explosives BDNPA and BDNP already mentioned.

According to the invention, the various components are fed to the roll nip between the two helically grooved rolls included in the mixing, shearing and rolling mill and arranged at an adjustable distance from each other and rotating counter to each other at different speeds, after which the mixture is worked on and between the rolls where it forms a material layer around the fastest rotating roll, from which the finished material is successively removed in the form of a coherent mass or in a new particulate form. The amount of binder and other liquid or semi-liquid matter included is only so great that the mixture in the unworked state essentially feels like and behaves like a dry powder. This generally means contents of up to a maximum of 15 percent by weight.

The present invention thus relates to a method for producing, by means of mixing, working and homogenizing, castable or alternatively compressible explosive substances of high viscosity from mixtures containing crystalline and/or particulate explosive substances and, if appropriate, action-enhancing additives, phlegmatizing agents and/or viscosity-reducing agents, if appropriate with strengthening effect, and a binder which can be of the curing type and can in itself have a viscosity-reducing effect on the mixture before it cures. A characteristic feature of the mixtures in question here is that they contain only so much binder and other viscosity-reducing agents that in the unworked state they essentially feel like a dry powder, completely without inherent viscosity. According to the invention, the components in question are brought to the roll nip between the two counter-rotating rolls in a so-called mixing, shearing and rolling mill, in which the mixture is worked until the air between the components included has been pressed out sufficiently to convert the previously pulverulent mass to a coherent mass of high viscosity which is removed from the fastest rotating roll in the form of newly formed particles or in continuous form.

The feeding of the various components can be carried out in different ways. The binder and other possible liquid or semi-liquid components can be fed to the particulate components immediately before these are fed to the rolling mill, for example by means of spraying as they fall down towards the roll nip, or all the components can be mixed in advance in a special mixing vessel, or the solid components can be fed to the roll nip and sprayed there with binder and other liquid or semi-liquid components.

A particularly important part in the method according to the invention is the addition of a suitable antistatic agent to the explosive mixture for removing its electrostatic charge, which otherwise arises during working on and between the rolls. The latter are of course earthed. Suitable antistatic agents have been found to be liquid or solid quaternary ammonium compounds dissolved in suitable solvent. Suitable amounts of antistatic agents are 0.01-5 % by weight calculated on the basis of the amount of polymeric binder added.

According to the invention, the feeding of the various components can take place at one or more points along the roll nip. This applies both to the solid and to the liquid components.

The mixing, working and homogenizing can also be carried out using a number of mixing, shearing and rolling mills connected in series. The binder used can be of the single-, two- or three-component type, and the various binder components can be added in one or more stages. This affords a number of different variants. Thus, all the components, in other words the binder too, can be mixed before being fed to the roll nip. Another alternative is that the binder and any other liquid components are sprayed onto the solid components either immediately before these are fed to the roll nip or when they have already been fed to the latter.

In multi-component systems it is also possible to prephlegmatize the explosive crystals with at least some of the components included in the final binder. If the binder is a polyurethane, some of the polyol or isocyanate included therein can for example be used for prephlegmatizing the explosive crystals. This therefore involves a multi-stage addition of the binder components in which some can be added before the explosive is fed to the roll nip and the remaining amount added in the roll nip itself, or alternatively involves the addition of the various components at different points along the rolling mill.

A pre-phlegmatizing of the explosive crystals can be carried out, for example, in aqueous phase with some of the polyol included in the binder, but this necessitates a drying of the product before it is fed to the rolling mill.

Another alternative is to pre-phlegmatize the explosive crystals with at least some of the isocyanate since, in this way, it is possible to bind up any residual water in the explosive. As is known, water in explosive mixtures gives rise to bubble formations in the finished product.

The following are examples of some products produced in accordance with the present invention:

EXAMPLE 1

Castable Composition

| | |
|---|---|
| Crystalline explosive such as HMX, RDX, HNS, TNT | 70-96% by weight |
| Solvent-free binder two-component polyurethane mixing ratio isocyanate: | |
| polyol = 1:2 | 5-30% by weight |
| Antistatic agent | 0.01-3% by weight calculated on basis of polymer |

EXAMPLE 2

Castable Composition

| | |
|---|---|
| Crystalline explosive | 65-95% by weight |
| Aluminium powder | 5-30% by weight |
| Binder (same as in Ex. 1) | 5-30% by weight |
| Antistatic agent | 0.01-3% by weight |

EXAMPLE 3

Granulatable compressible product

| | |
|---|---|
| Crystalline explosive | 80-98% by weight |
| Binder single-component thermoplastic polyurethane dissolved in suitable solvent for example ethyl acetate | 20-2% by weight |
| Antistatic agent | 0.01-5% by weight calculated on basis of polymer | is granulated directly from the roll, dried for removing the ethyl acetate, and pressed to form shaped charges.

The invention is defined in greater detail in the subsequent patent claims. It will also be described here in slightly greater detail together with a number of preferred embodiments of installations adapted for this purpose. However, the installations described here should be regarded as examples which in no way restrict the invention as defined in the patent claims.

Figure 2:
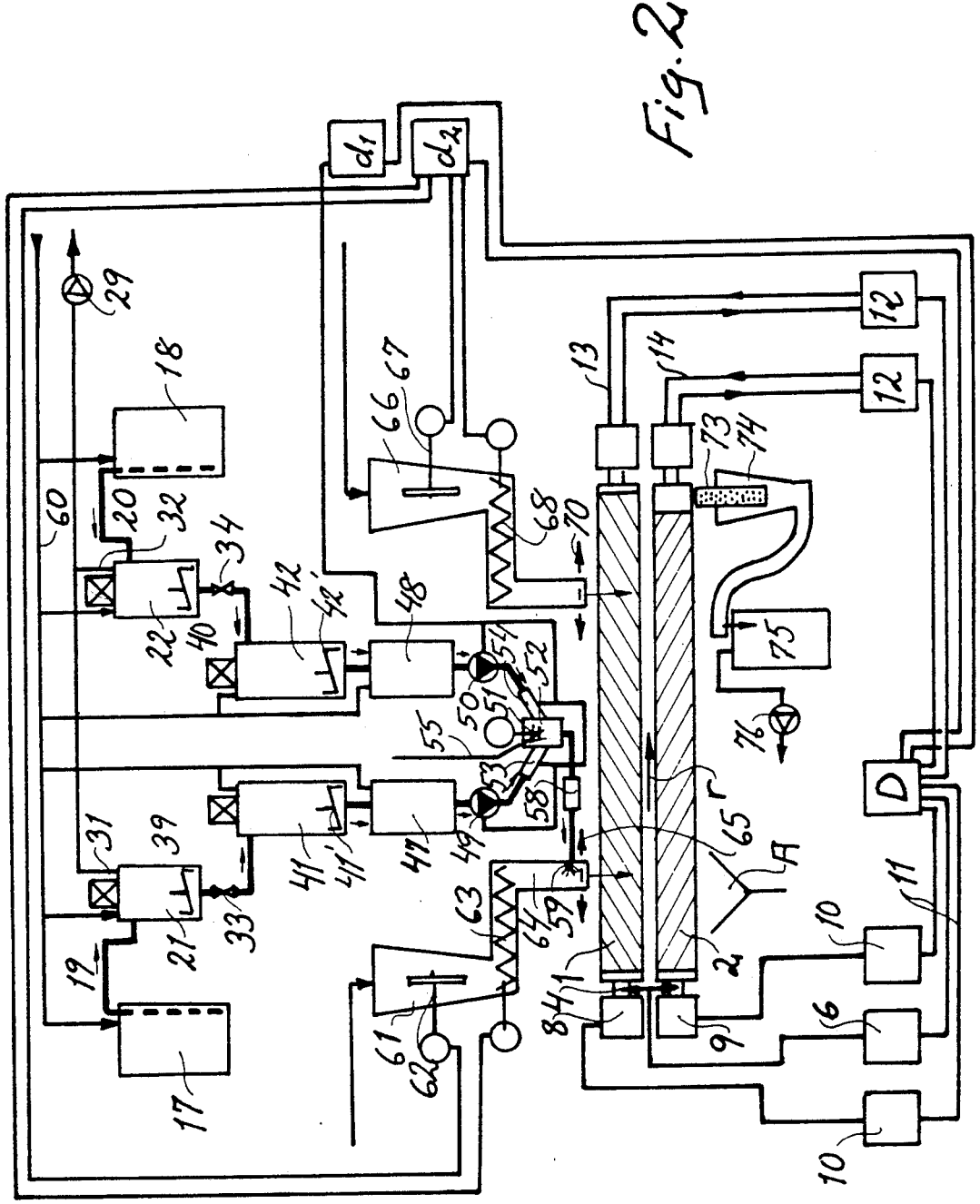
FIG. 2 shows the same arrangement as FIG. 1 in a skeleton diagram.
Figure 3:
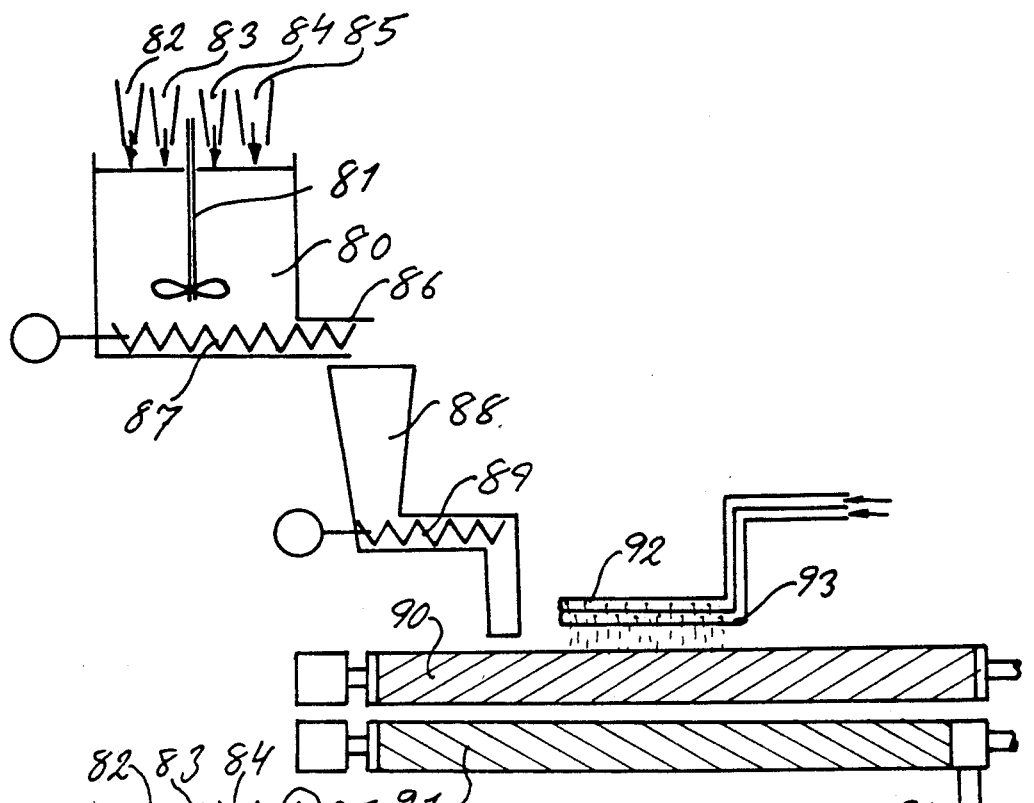
FIGS. 3 and 4 show alternative methods for adding the variuos components.
Figure 4:
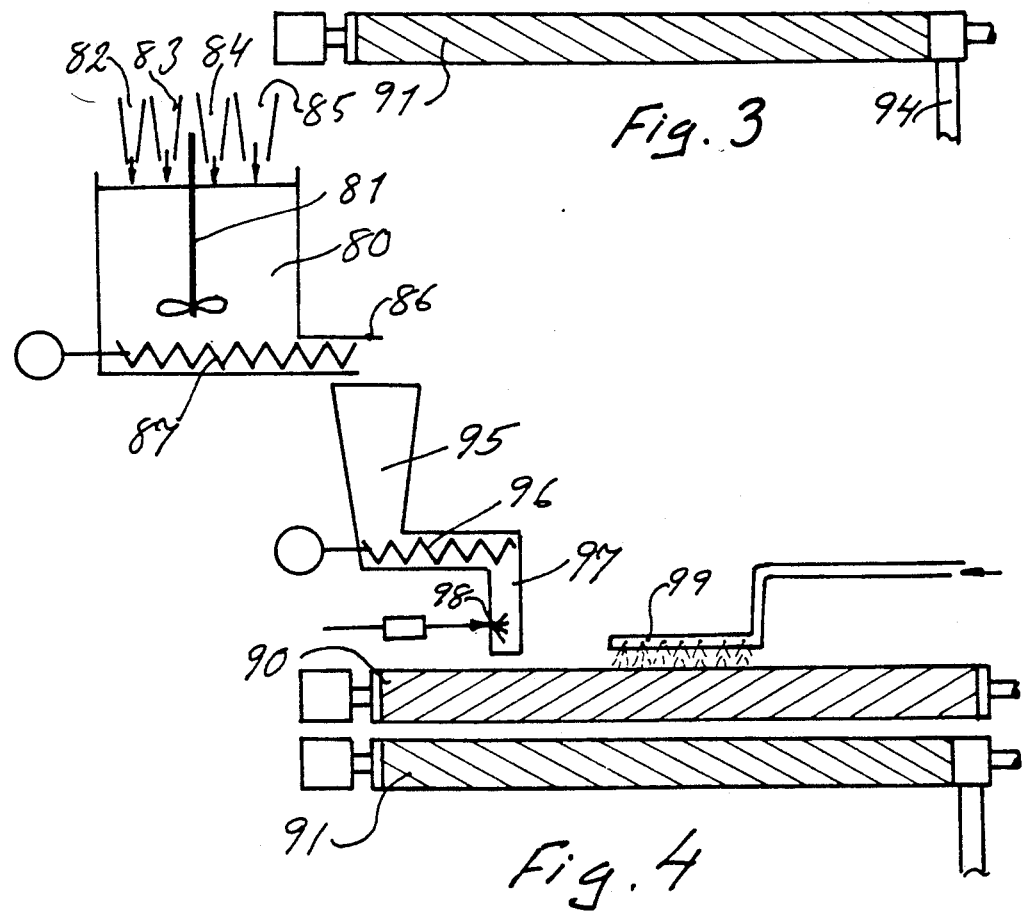

FIG. 1 shows diagrammatically a complete arrangement for carrying out a variant of the method according to the invention, while FIG. 2 shows the same arrangement in a skeleton diagram, and FIGS. 3 and 4 show alternative methods for adding the various components. However, not all parts have been included in FIGS. 3 and 4.

The arrangement according to the invention shown in FIG. 1 partially in oblique projection and in FIG. 2 as a skeleton diagram can be divided into five separate main sections, consisting of a working section, a section for supply of solid components, a section for supply of binder and/or other liquid components, a section for handling the finished product, and a control function for controlling the various parts of the process individually and as a unit. When fully developed for production, the arrangement must also be provided with elements for handling such waste as cannot be avoided, for example in the form of flush waste upon rinsing of the binder-adding section. However, this waste section has not been included in the figure, since it would have made the figure even more difficult to study. Certain simplifications have had to be made in some other cases too in order to keep the complexity of the figure to a reasonable level.

A few parts of lesser importance have only been included in one of FIGS. 1 and 2.

Starting with the working section, this comprises two rolls 1 and 2 arranged in such a way as to be displaceable in parallel relative to each other and rotating in opposite directions at different speeds, the basic design of these rolls 1 and 2 corresponding to that which is described in the European Patents referred to hereinabove. The roll nip 3 formed between the rolls 1 and 2 is adjustable by means of the displaceable shaft bearing 4 of the roll 1 and a regulating device 5 incorporated thereon, for example in the form of a hydraulic piston which is in turn controlled by a control device 6 which in turn is connected via line 7 to a main computer D which controls the whole process both in its part stages and in its entirety. The rolls 1 and 2 are also provided, at their bearing ends hidden in the figure, with corresponding bearing attachments which are displaceable relative to each other, but which have not been drawn in the figure. By adjusting the distance of the rolls from each other, and thereby the size of the roll nip, it is possible to regulate with great precision the degree of working of the material fed to the roll nip 3.

The principle of the so-called shearing and rolling mill also includes the fact that the rolls should be rotated at different speeds. In this case, the roll 1 is driven at the lower speed via an hydraulic motor 8, while the roll 2 is driven at an at least slightly higher speed via its own hydraulic motor 9. These two hydraulic motors are each connected, for the purpose of separate mutual speed adjustment, to a control device 10 which in turn is connected via communication line 11 to the main computer D. As regards those control devices already mentioned and also mentioned later on in the text, their communication lines to the elements which they are intended to control and to the main computer have only been drawn purely diagrammatically. The temperature of the two rolls 1 and 2 is furthermore controlled by a regulator 12 which, via connections 13 and 14 respectively, is able to supply the rolls, for example, with steam and cooling water, respectively, in order to regulate the temperature of the rolls in accordance with the temperature which is desired in each particular case. The regulator 12 is in turn connected to a control device 15 which in turn can communicate with the main computer D via connection 16.

In FIGS. 1 and 2, the feed direction of the material along the roll is towards the right in the figures, that is to say in the direction indicated by the arrow r.

For practical reasons we will now go over to the binder section. In the arrangement shown, the binder consists of a polyurethane which necessitates an initially separate treatment of polyol and isocyanate, finishing with a mixing chamber in order to be fed from there with the shortest possible delay to the explosive. In order to simplify the description, the polyol and isocyanate sections, which are constructed identically, are dealt with together as far as the mixing chamber. The reference figures for the isocyanate section have consequently been put in brackets.

The polyol and isocyanate sections thus begin with storage vats 17 (18) from which the respective product can be transferred via lines 19 (20) to metering containers 21 (22). The lines 19 (20) are each provided with valves 23 (24) which are each controlled via connections 25 (26) by a control device 27. The latter also controls via connection 28 a vacuum pump 29 by means of which a vacuum can be established in the metering containers 21 (22) via pipe connections 31 (32). The control device 27, like the previous control devices, is in communication with the main computer D via connection 27'. The metering containers 21 (22) are moreover provided with bottom valves 33 (34) each controlled by a control device 35 (36) connected via connections 37 (38) to the main computer D. Finally, the metering containers are provided with their own stirrers 39 (40).

In order to achieve the desired polyol/isocyanate mixing ratio, a vacuum is established in the metering containers 21 (22) with the valves closed, and thereafter the inlet valves 23 (24) are opened and the containers are filled to the desired level, after which the valves are closed. The metering containers 21 (22) can then be emptied via bottom valves 33 (34) into the respective tempering container 41 (42), each provided with its own stirrer 41' (42') and tempering elements 43 (44) controlled by the control device 45 which is in communication with the main computer D via connection 46. The components are conveyed from the tempering chambers 41 (42) to intermediate chambers 47 (48) and from there via metering pumps 49 (50) to a mixing chamber 52 which is provided with its own stirrer 51 and is provided with a first inlet 53 for the polyol and a second inlet (54) for the isocyanate, and also a third inlet 55 for the supply of solvent for flushing those parts of the system which contain both polyol and isocyanate in the event of any lengthy shutdowns or alterations in the process.

The two metering pumps 49 (50) are controlled by a control device 56 which is in contact with the main computer D via connection 57. The control device 56 also controls a spray unit 58 to which the polyol/isocyanate mixture is conveyed from the mixing chamber 52. In the spray unit 58 the mixture is pressurized and conveyed from there to an annular nozzle 59 arranged about the outlet part for the explosive supply, which means that the explosive which is in particulate form in this case, for example in the form of phlegmatized HMX, RDX or HNS, is exposed to a concentrated shower of polymeric binder immediately before it reaches the roll nip 3. As regards the solvent section, it will also be noted that all its parts as far as the mixing chamber 52 can be exposed to an inert atmosphere, for example in the form of nitrogen gas, via a conduit system 60. In its operating form, the solvent section of course contains more valves than are shown in the figure, but because these are of no principal importance they have been omitted here.

The supply section for solid or semi-solid components consists here of a first section for the supply of on the one hand phlegmatized crystalline explosive, which can thus consist of HMX, RDX, HNS or the like, and a second section for the supply of binder to the said solid component, and a third section for the supply of other solid components such as aluminium powder or another action-enhancing component or phlegmatizing component.

The first section for the supply of explosive consists of a feeding hopper 61 which is provided with automatic charging (not shown) and with a stirrer 62 or other arrangement for preventing jamming in the hopper, and leading into a feeding screw 63 which in turn leads into an outlet shaft 64 around whose lower part the previously mentioned annular nozzle 59 is arranged. As indicated in the figure by arrow 65, this whole feeding part is displaceable in any chosen direction along the roll nip 3 in order to thereby determine the degree of working.

The second dry-feeding arrangement, which is used for example for the supply of aluminium powder, consists of a feeding hopper 66 which is provided with a charging device (not shown) and is provided with a stirrer or the like 67 for preventing jamming in the hopper, and leading into a feeding screw 68 which in turn leads into an outlet shaft 69. As is shown by the arrow 70, this feeding part too is displaceable in any chosen direction along the roll nip 3 in order to thereby determine the degree of working. Since the roll 2 is the fastest roll, the worked material mixture forms a covering on this roll and is fed along the latter in the direction of the arrow r, and since the material is removed from the roll 2 at one and the same point, the degree of working is determined not only by the roll pressure, that is to say the distance between the rolls, but also by where the material is brought to the roll nip. The control of the whole supply of the solid components, including all the auxiliary systems, has been indicated by the control device 71 which has been coupled to the main computer D via connection 72.

An important factor in the method according to the invention which has not yet been discussed in conjunction with the figure is the supply of antistatic agent, which, in the example shown, is effected in liquid form, for example with a liquid quaternary ammonium compound or a solid compound of this type dissolved in a suitable solvent. In the example shown, the supply is effected via the spray nozzle 79, and the electrostatic charge induced upon rotation of the rolls is then led off via the rolls which are of course earthed. The supply of the antistatic agent can take place at one or more points along the rolls, or alternatively along the whole of the rolls or directly together with the binder. If use is made of an antistatic agent dissolved in a solvent, then the solvent must be removed at a later stage.

The section for handling the worked material is indicated here by a perforated granulating roll 73 which is expediently provided with an internal scraper (not shown). The granulating roll rotates against the covering formed on the roll 2, in which respect the material which is pressed through the holes forms granules which are received in a hopper 74, from which the finished granules are passed on to a storage point 75 in which a vacuum has been established by means of a vacuum pump 76. The rotation of the granulating roll and its pressure against the covering are determined by the control device 77 which is in communication with the main computer D via 78.

In FIG. 2 $d_1$ and $d_2$ indicate data substations for controlling the addition of binder and powder, respectively. In the figure there is no separate supply of antistatic agent, since this can be carried out at any chosen point together with other components.

The granulating roll can be replaced by another suitable element known per se, for example in the form of a scraper which takes the film or covering off the roll 2 in the form of a strip or in another form as desired in each particular case.

The hopper A indicates an arrangement for the collection of waste from the rolls 1 and 2.

FIG. 3 shows an arrangement comprising a mixing vessel 80 provided with a stirrer 81. All the components except binder and antistatic agent are introduced via inlets 82-85. After mixing, the material is fed via the outlet 86 by a feeding screw 87 onwards to a metering unit 88 with its own feeding screw 89, and from there to the mixing, shearing and rolling mill 90, 91 where binder and antistatic agent are successively supplied along part of the rolling mill via drop tubes 92 and 93, respectively. At the output end of the fastest rotating roll 91 there is a fixed knife or doctor blade (not shown in the figure) which scrapes off the finished material in the form of a continuous layer 94.

In the arrangement shown in FIG. 4, the various components are mixed in the same type of mixing vessel 80 as in FIG. 3 and are then fed onwards to a metering unit 95 provided with its own feeding screw 96, and from there onwards to the mixing, shearing and rolling mill 90, 91 via the outlet 97. The antistatic agent is supplied via a separate inlet 98 immediately before the material, which may advantageously be phlegmatized with 0.5-1 % wax, is brought to the mixing, shearing and rolling mill. The binder is added via a separate drop tube 99.

The invention should not in any way be regarded as being limited by the above examples, since it is defined in the following patent claims.

I claim:

1. Method for producing, by means of mixing, working and homogenizing, binder-containing castable or compressible explosive substance of high viscosity from a mixture containing crystalline explosive, or particulate explosive or both; at least one liquid or semi-liquid binder which is compatible with all of the other components in said mixture, and which is selected from the group consisting of thermosetting plastic, thermoplastic material and thermoelastic material; and optionally at least one optional component selected from the group consisting of actionenhancing additives, phlegmatizing agents and viscosity-reducing agents; and wherein the amount of said binder and optionally said viscosity-reducing agent is such that the mixture in the unworked state behaves like and essentially feels like a dry powder completely without inherent viscosity; which method comprises bringing the components of said mixture to the roll nip between the two helically grooved rolls of a mixing, shearing and rolling mill, wherein said rolls are arranged at an adjustable distance from each other and are counter-rotating at different speeds; then working said mixture between said rolls until the included air between the particles has been pressed out in sufficient amount so as to convert said mixture into a coherent mass of high viscosity; and then removing the coherent mass in a continuous form or in a newly formed particulate form associated therewith from the roll that is rotating the fastest.

2. The method of claim 1 wherein said explosive is selected from the group consisting of trinitrotoluene, pentaerythritol tetranitrate, RDX, HMX, NHS, cyclotrimethylene trinitramine, cyclotetramethylene tatranitramine, hexanitrostilbene ammonium nitrate and ammonium perchlorate.

3. The method of claim 1 wherein said action-enhancing additives are metal powders; said viscosity-reducing agents are liquid explosives; and said phlegmatizing agents are waxes.

4. The method of claim 1 which further includes working an antistatic agent into said mixture at said roll nip.

5. The method of claim 1 wherein said explosive substance, said binder and said optional component, when employed, are supplied at different points along said roll nip extending along the whole length of the rolling mill.

6. The method of claim 1 wherein said mixing, working and homogenizing are carried out along several mixing, shearing and rolling mills connected to each other in series and wherein said explosive substance is transferred from the output end of a preceding rolling mill to the input end of a following rolling mill.

7. The method of claim 6 wherein said explosive substance is transferred directly from the output end of a preceding rolling mill to the input end of a following rolling mill.

8. The method of claim 6 wherein said explosive substance is transferred via a feeding device from the output end of a preceding rolling mill to the input end of a following rolling mill.

9. The method of claim 8 wherein said feeding device is intermediate rolls.

10. The method of claim 4 wherein said antistatic agent is a liquid ammonium compound or a solid ammonium compound dissolved in a solvent.

11. The method of claim 1 wherein said binder is sprayed onto said crystalline explosive which said crystalline explosive is being conveyed to said roll nip.

12. The method of claim 1 wherein at least the particulate explosive employed is pre-phlegmatized in a first stage with a portion of the binder or with at least one of the components of the binder when a multi-component binder is employed; and then supplying the remaining binder or components of the binder during working on the mixing, shearing and rolling mill.

13. The method of claim 12 wherein said binder is a polyurethane system, and wherein said particulate explosive is pre-phlegmatized in aqueous phase with a portion of polyol component of said polyurethane system; and then supplying the remaining binder components during working on the mixing, shearing and rolling mill.

14. The method of claim 1 which comprises mixing all of the components together prior to conveying such to the mixing, shearing and rolling mill.

15. The method of claim 1 which comprises supplying the solid components to the mixing, shearing and rolling mill at one or more points thereof; and when said solid components are on said mixing, shearing and rolling mill adding the binder and any liquid or semi-liquid optional components, when employed, to said solid components.

16. The method of claim 1 wherein said binder is a two component polyurethane system containing a polyol part and an isocyanate part, and wherein said polyol part and isocyanate part are mixed together prior to being added to the solid component of the explosive.

17. The method of claim 1 wherein each helically grooved roll has channels that form an angle of 5° to 45° to the axis of the roll.

18. The method of claim 1 wherein the maximum amount of binder in said mixture is 15% by weight.

19. The method of claim 4 wherein the amount of said antistatic agent is 0.01–5% by weight based upon the amount of binder.

* * * * *